United States Patent  
Hagihara

(10) Patent No.: US 11,738,469 B2
(45) Date of Patent: Aug. 29, 2023

(54) CONTROL APPARATUS, ROBOT SYSTEM, AND CONTROL METHOD

(71) Applicant: Seiko Epson Corporation, Tokyo (JP)

(72) Inventor: Tsutomu Hagihara, Hara-mura (JP)

(73) Assignee: SEIKO EPSON CORPORATION

( * ) Notice: Subject to any disclaimer, the term of this patent is extended or adjusted under 35 U.S.C. 154(b) by 178 days.

(21) Appl. No.: 16/666,623

(22) Filed: Oct. 29, 2019

(65) Prior Publication Data

US 2020/0130198 A1    Apr. 30, 2020

(30) Foreign Application Priority Data

Oct. 30, 2018   (JP) ................................ 2018-204520

(51) Int. Cl.
   *B25J 13/06*       (2006.01)
   *G05B 19/4155*  (2006.01)

(52) U.S. Cl.
   CPC .......... *B25J 13/06* (2013.01); *G05B 19/4155* (2013.01); *G05B 2219/39371* (2013.01)

(58) Field of Classification Search
   CPC ..... B25J 13/00; B25J 13/06; B25J 9/00; B25J 9/16; B25J 9/1628; B25J 9/0081; B25J 9/1602; B25J 9/1679; G05B 19/00; G05B 19/02; G05B 19/18; G05B 19/4155; G05B 2219/39; G05B 2219/39371
   USPC ....................................................... 700/264
   See application file for complete search history.

(56) References Cited

U.S. PATENT DOCUMENTS

| | | | | |
|---|---|---|---|---|
| 9,356,894 | B2* | 5/2016 | Appelman | G06Q 10/107 |
| 2013/0067341 | A1* | 3/2013 | Appelman | G06Q 10/107 |
| | | | | 715/739 |
| 2018/0250822 | A1* | 9/2018 | Shimodaira | B25J 9/1697 |
| 2018/0272526 | A1 | 9/2018 | Nagashima | |
| 2019/0351544 | A1* | 11/2019 | Sakaguchi | B25J 9/1689 |
| 2020/0156258 | A1* | 5/2020 | Watanabe | G06F 3/011 |

FOREIGN PATENT DOCUMENTS

| | | | |
|---|---|---|---|
| CN | 108621155 A | | 10/2018 |
| JP | 2013-049102 A | | 3/2013 |
| JP | 2013-154410 A | | 8/2013 |
| JP | 2013154410 A | * | 8/2013 |
| JP | 2014-104529 A | | 6/2014 |
| JP | 2018-144162 A | | 9/2018 |

* cited by examiner

*Primary Examiner* — Khoi H Tran
*Assistant Examiner* — Sarah A Tran
(74) *Attorney, Agent, or Firm* — Harness, Dickey & Pierce, P.L.C.

(57) ABSTRACT

A control apparatus includes a memory and a processor. The processor is configured to control a distal end portion of a robot to rotate around first and second distal end axes, perform a first control mode in which the distal end portion rotates around the first and second distal end axes, perform a second control mode in which the distal end portion rotates around the first distal end axis and does not rotate around the second distal end axis, switch the first control mode to the second control mode when the first distal end axis is perpendicular to a working surface, and control the distal end portion to work while performing the second control mode and maintaining a state in which the first distal end axis is perpendicular to the working surface after the first control mode is switched to the second control mode.

8 Claims, 7 Drawing Sheets

CONTROL APPARATUS, ROBOT SYSTEM, AND CONTROL METHOD

The present application is based on, and claims priority from, JP Application Serial Number 2018-204520, filed Oct. 30, 2018, the disclosure of which is hereby incorporated by reference herein in its entirety.

BACKGROUND

1. Technical Field

The present disclosure relates to a control apparatus, a robot system, and a control method.

2. Related Art

In these days, for example, assembly work of assembling components using a single-arm vertical articulated robot or the like may be performed. For example, JP-A-2013-154410 discloses a vertical articulated robot to which a robot hand may be attached. When work with the robot hand is performed, a distal end portion of the vertical articulated robot with the robot hand attached thereto is set in a predetermined position and a predetermined posture, and thereby, the work may be performed.

Further, JP-A-2013-154410 discloses teaching of teaching taught points of a work position etc. to the vertical articulated robot by moving the vertical articulated robot via a teaching pendant by an operator prior to the work by the vertical articulated robot.

However, in JP-A-2013-154410, for example, even when the distal end portion of the vertical articulated robot is set in a preferable position and a preferable posture by teaching so that the robot hand can smoothly perform work with respect to a working surface, a worker may erroneously operate the teaching pendant and change the position and the posture of the distal end portion.

SUMMARY

The present disclosure has been achieved to solve the above described problem and can be realized as the following embodiments.

A control apparatus according to an aspect of the present disclosure includes a robot control unit that controls a vertical articulated robot having a robot distal end portion that pivots about a distal end first axis and pivots about a distal end second axis crossing the distal end first axis, and a display control unit that displays a window containing a first operation part for pivoting the robot distal end portion about the distal end first axis using the robot control unit and a second operation part for pivoting the robot distal end portion about the distal end second axis using the robot control unit on a display unit, wherein, in the window, a control mode can be switched between a first control mode of enabling an operation by the first operation part and an operation by the second operation part and a second control mode of enabling the operation by the first operation part and disabling the operation by the second operation part, and, at teaching of control of the vertical articulated robot, the robot distal end portion is controlled into a posture with the distal end first axis perpendicular to a working surface on which the vertical articulated robot performs work in the first control mode, and then, the control mode can be switched to the second control mode.

A robot system according to an aspect of the present disclosure includes the control apparatus according to the aspect of the present disclosure and the vertical articulated robot.

DESCRIPTION OF EXEMPLARY EMBODIMENTS

As below, a control apparatus and a robot system according to the present disclosure will be explained in detail based on preferred embodiments shown in the accompanying drawings. Hereinafter, for convenience of explanation, the upsides in FIGS. 1 to 8 may be referred to as "upper" or "above" and the downsides may be referred to as "lower" or "below".

First Embodiment

The first embodiment of the control apparatus and the robot system according to the present disclosure will be explained with reference to FIGS. 1 to 6.

Figure 1:
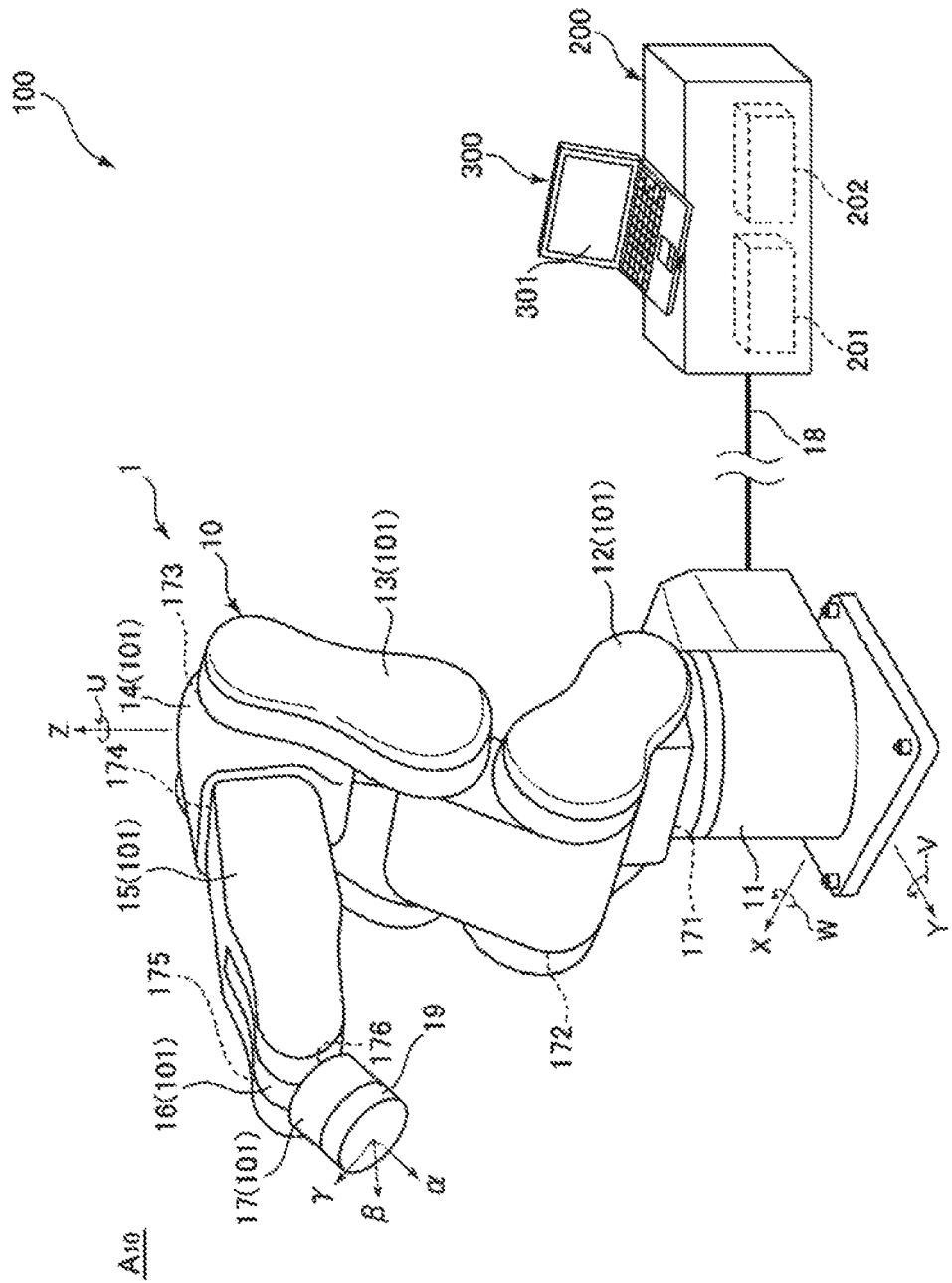
FIG. 1 shows an overall configuration of a robot system of a first embodiment.

As shown in FIG. 1, a robot system 100 includes a vertical articulated robot (hereinafter, also simply referred to as "robot") 1 and a control apparatus 200 that controls the robot 1. The robot 1 is a single-arm six-axis vertical articulated robot in the embodiment, and an end effector 20 may be attached to the distal end portion thereof. The control apparatus 200 is placed apart from the robot 1 and may include a computer with a CPU (Central Processing Unit) as an example of a processor provided inside etc. The usage of the robot system 100 is not particularly limited, but may be used for various types of work of holding, carrying, assembly, inspection, etc. of work pieces including electronic components and electronic apparatuses, for example.

The robot 1 has a base 11 and a movable unit 10.

The base 11 is a support that supports the movable unit 10 drivably from below, and fixed to e.g. a floor within a factory. In the robot 1, the base 11 is electrically coupled to the control apparatus 200 via a cable 18. Note that the coupling between the robot 1 and the control apparatus 200 is not limited to wired coupling like the configuration shown in FIG. 1, but may be wireless coupling, for example.

The movable unit 10 has a plurality of arms 101 pivotably coupled to each other. In the embodiment, the movable unit 10 has a first arm 12, a second arm 13, a third arm 14, a fourth arm 15, a fifth arm 16, and a sixth arm 17, and these arms 101 are sequentially coupled in this order from the base 11 side. Note that the number of arms 101 of the movable unit 10 is not limited to six, but may be e.g. one, two, three, four, five, seven, or more. Further, the sizes of the respective arms including the entire lengths are each not particularly limited, but can be appropriately set.

The base 11 and the first arm 12 are coupled via a joint 171. The first arm 12 is pivotable around a first pivot axis parallel to the vertical direction as a pivot center about the first pivot axis relative to the base 11. The first pivot axis coincides with a normal of the floor to which the base 11 is fixed.

The first arm 12 and the second arm 13 are coupled via a joint 172. The second arm 13 is pivotable around a second pivot axis parallel to the horizontal direction as a pivot center relative to the first arm 12. The second pivot axis is parallel to an axis orthogonal to the first pivot axis.

The second arm 13 and the third arm 14 are coupled via a joint 173. The third arm 14 is pivotable around a third pivot axis parallel to the horizontal direction as a pivot center relative to the second arm 13. The third pivot axis is parallel to the second pivot axis.

The third arm 14 and the fourth arm 15 are coupled via a joint 174. The fourth arm 15 is pivotable around a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. The fifth arm 16 is pivotable around a fifth pivot axis as a pivot center relative to the fourth arm 15. The fifth pivot axis is orthogonal to the fourth pivot axis.

The fifth arm 16 and the sixth arm 17 are coupled via a joint 176. The sixth arm 17 is pivotable around a sixth pivot axis as a pivot center relative to the fifth arm 16. The sixth pivot axis is orthogonal to the fifth pivot axis.

Further, the sixth arm 17 is a robot distal end portion located at the most distal end side of the movable unit 10. The sixth arm 17 may pivot independently about respective axes of a distal end first axis $\alpha$, a distal end second axis $\beta$, and a distal end third axis $\gamma$ crossing one another together with the end effector 20 by driving of the movable unit 10.

In the robot 1, a force detection unit 19 that detects a force is detachably placed in the movable unit 10. The movable unit 10 may be driven with the force detection unit 19 placed therein.

In the embodiment, the force detection unit 19 is placed at the distal end of the sixth arm 17. Further, the end effector 20 may be detachably attached to the force detection unit 19.

The location in which the force detection unit 19 is placed is not limited to the sixth arm 17, i.e., the arm 101 located at the most distal end side, but may be placed e.g. at the other arm 101 or between the adjacent arms 101.

The force detection unit 19 may detect a force transmitted via the end effector 20 at the work by the robot 1 or the like. The force detection unit 19 is not particularly limited, but, in the embodiment, a six-axis force sensor that can detect force components in respective axis directions of an X-axis, a Y-axis, a Z-axis orthogonal to one another, a force component in W directions about the X-axis, a force component in V directions about the Y-axis, and a force component in U directions about the Z-axis. Note that, in the embodiment, the Z-axis direction is the vertical direction. Further, the force components in the respective axis directions may be referred to as "translational force components" and the force components about the respective axes may be referred to as "torque components". The force detection unit 19 is not limited to the six-axis force sensor, but may have another configuration.

The control apparatus 200 has a display control unit 201 and a robot control unit 202. The display control unit 201 may display an operation window 2, which will be described later, on a display unit 301 and, for example, part or all of the CPU has the function thereof. The robot control unit 202 may control the robot 1 and, for example, part or all of the CPU has the function thereof.

The robot system 100 is used with e.g. a notebook or tablet personal computer (hereinafter, referred to as "PC") 300. The PC 300 contains a display as the display unit 301 that displays various kinds of information. The display unit 301 has liquid crystal and has a touch-panel function. The PC 300 is electrically coupled to the control apparatus 200. Note that the coupling between the PC 300 and the control apparatus 200 is preferably wireless coupling, however, may be wired coupling or coupling via a network such as the Internet.

As described above, the robot system 100 is used for various types of work of holding, carrying, assembly, inspection, etc. of work pieces including electronic components and electronic apparatuses, for example. Further, the respective types of work are performed within a drive range A10 in which the movable unit 10 of the robot 1 can be driven at the maximum. Examples of action states of the robot 1 in this regard will be explained with reference to FIGS. 2 to 4.

Figure 2:
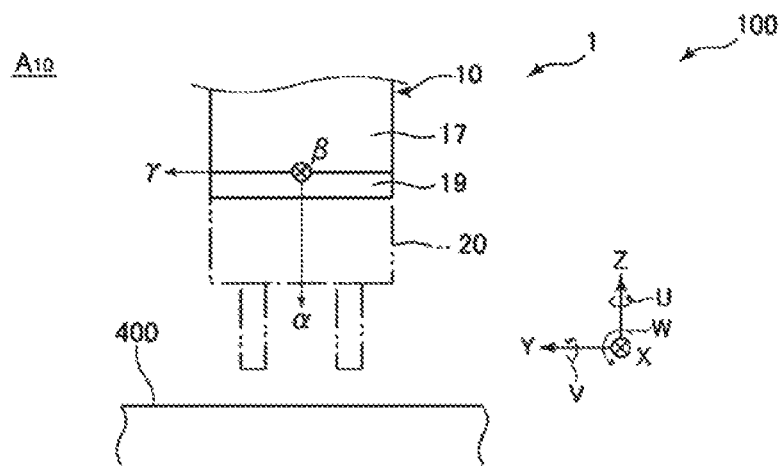
FIG. 2 is a side view showing an example of an action state of a vertical articulated robot of the robot system shown in FIG. 1.
Figure 3:
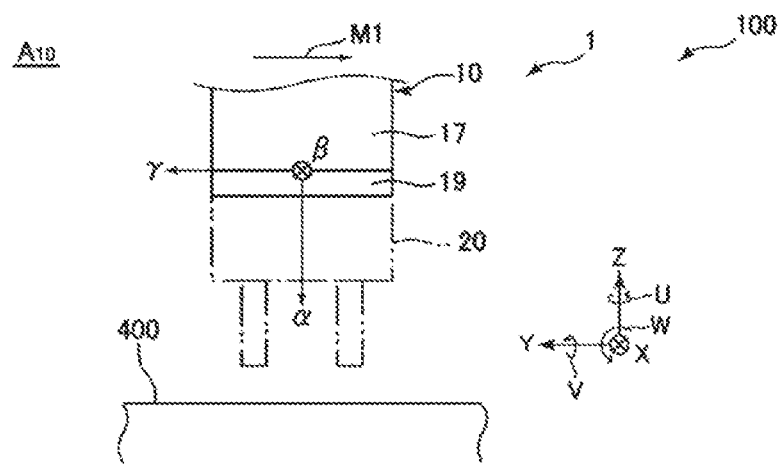
FIG. 3 is a side view showing an example of the action state of the vertical articulated robot of the robot system shown in FIG. 1.
Figure 4:
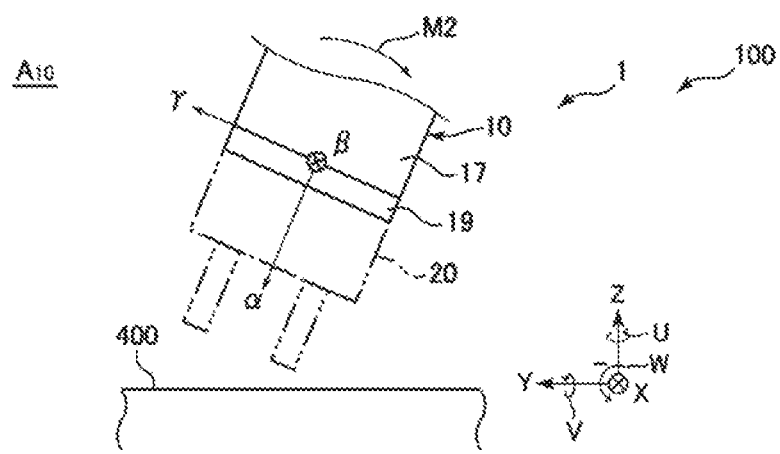
FIG. 4 is a side view showing an example of the action state of the vertical articulated robot of the robot system shown in FIG. 1.

As shown in FIGS. 2 to 4, the end effector 20 attached to the robot 1 may perform work on a horizontal working surface 400 having a normal along the Z-axis.

In the robot system 100, teaching is performed prior to the work. In the teaching, as shown in FIG. 2, the end effector 20 is moved to a predetermined position closer to the working surface 400. Then, the robot 1 is set in a posture with the distal end first axis $\alpha$ orthogonal to the working surface 400. Hereinafter, the state shown in FIG. 2 is referred to as "ready-to-start work state". In the embodiment, it is preferable that the robot 1 performs work while keeping the posture in the ready-to-start work state, i.e., the posture with the distal end first axis $\alpha$ orthogonal to the working surface 400 during the work on the working surface 400.

By the teaching, the positions and postures of the first arm 12 to the sixth arm 17 may be stored, that is, taught for the robot 1. Here, representatively, a case of teaching the position and the posture of the sixth arm 17 of the first arm 12 to the sixth arm 17 is described. Further, the teaching can be performed by operation of the operation window 2 displayed on the display unit 301.

When the robot 1 performs work on the working surface 400, from the ready-to-start work state, as shown in FIG. 3, the movable unit 10, particularly, the sixth arm 17 moves in e.g. a direction of a horizontal arrow M1, and thereby, the robot may smoothly perform the work while keeping the posture.

However, even in the ready-to-start work state, when the operation window 2 is subsequently erroneously operated, as shown in FIG. 4, the movable unit 10, particularly, the sixth arm 17 may pivot in e.g. a direction of an arrow M2 about the distal end second axis β. In this case, the distal end first axis α may be inclined relative to the working surface 400, the posture may not be kept, and the work may be difficult.

Accordingly, the robot system 100 is configured to prevent the above described problem. As below, the configuration and action will be explained.

Figure 5:
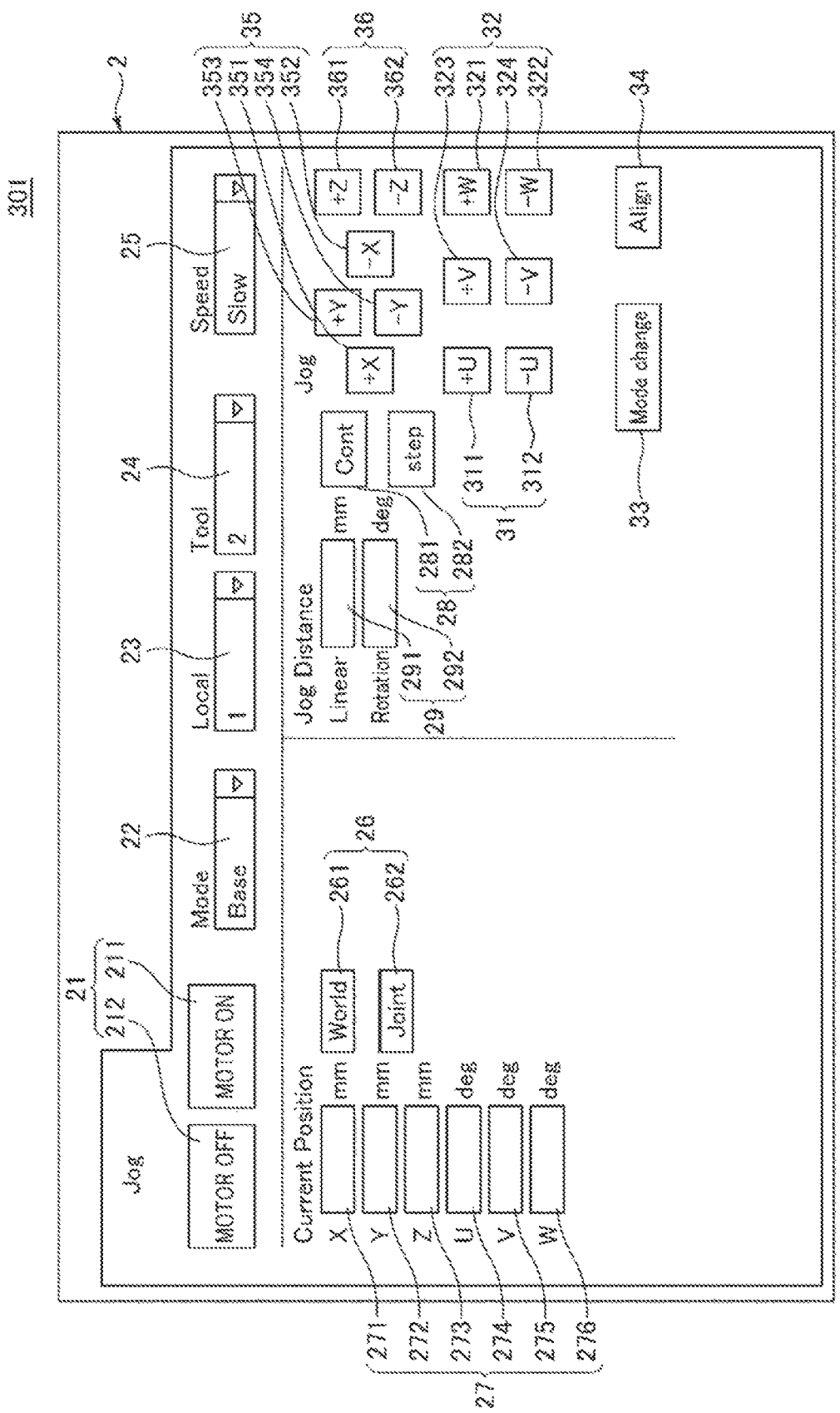
FIG. 5 shows a first control mode of a window displayed on a monitor of the robot system shown in FIG. 1.
Figure 6:
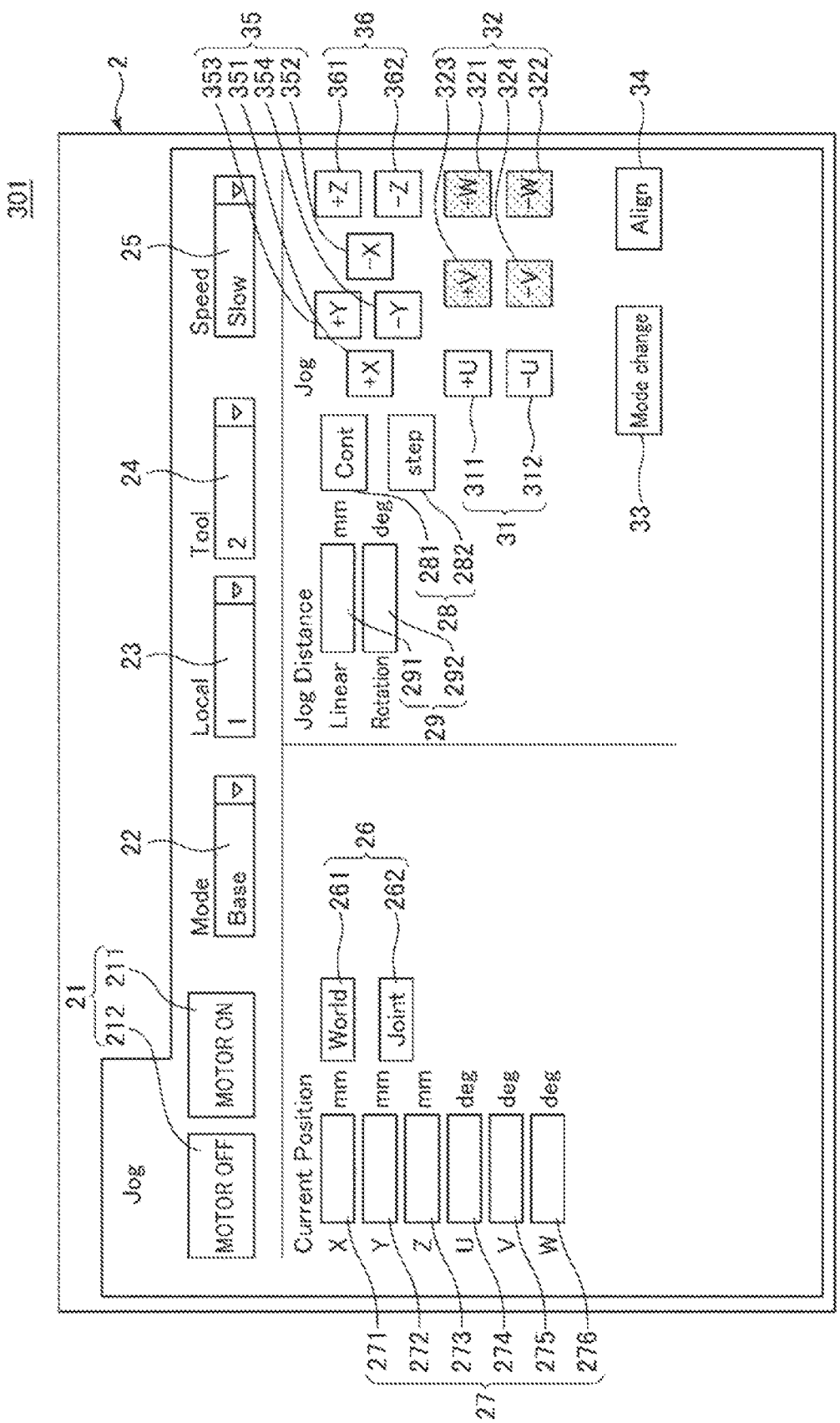
FIG. 6 shows a second control mode of the window displayed on the monitor of the robot system shown in FIG. 1.

As shown in FIGS. 5 and 6, the operation window 2 contains a motor switching part 21, a robot action mode switching part 22, a coordinate system switching part 23, an end effector switching part 24, an action speed switching part 25, an action object switching part 26, a position and angle display part 27, an action state switching part 28, a distance and angle display part 29, a first operation part 31, a second operation part 32, a third operation part 33, a fourth operation part 34, a fifth operation part 35, and a sixth operation part 36. As described above, the display unit 301 has the touch-panel function. Thereby, the respective switching parts and the respective operation parts may be each press-operated on the operation window 2. Signals generated when the respective switching parts and the respective operation parts are pressed are transmitted to the robot 1 via the robot control unit 202, and the robot 1 may perform actions based on the signals.

The motor switching part 21 is an operation part for switching ON/OFF of respective motors as drive sources that drive each of the joint 171 to the joint 176. The motor switching part 21 has a switch 211 for setting the motors in drivable states and a switch 212 for setting the motors in drive stop states.

The robot action mode switching part 22 is an operation part for switching an action mode of the robot 1.

The coordinate system switching part 23 is an operation part for switching a coordinate system for the action of the robot 1.

The end effector switching part 24 is an operation part for switching the end effector 20 to act.

The action speed switching part 25 is an operation part for switching an action speed of the robot 1 at teaching in a stepwise manner.

The action object switching part 26 is an operation part for switching an action mode in which the robot 1 is to act. The action object switching part 26 has a switch 261 for action of the entire robot 1 and a switch 262 for action of a predetermined joint.

The position and angle display part 27 is a part for displaying current position and rotation angle of the sixth arm 17. The position and angle display part 27 has a first display part 271 showing an X-coordinate, a second display part 272 showing a Y-coordinate, a third display part 273 showing a Z-coordinate, a fourth display part 274 showing a pivot angle in the U directions about the Z-axis, a fifth display part 275 showing a pivot angle in the V directions about the Y-axis, and a sixth display part 276 showing a pivot angle in the W directions about the X-axis.

The action state switching part 28 is an operation part for switching an action state of the robot 1 at teaching. The action state switching part 28 has a switch 281 for continuous action of the robot 1, and a switch 282 for intermittent action, i.e., pitch feed action of the robot 1.

The distance and angle display part 29 has a first display part 291 that displays a movement distance to which the robot 1 moves per single action and a second display part 292 that displays a pivot angle to which the robot 1 pivots per single action when the switch 282 is selected.

The first operation part 31 is an operation part for operation of pivoting the sixth arm 17 about the distal end first axis α parallel to the Z-axis, i.e., in the U directions at teaching. The first operation part 31 has a U direction forward pivot operation part 311 that pivots the sixth arm 17 toward the positive side in the U direction, that is, forwardly pivots the arm, and a U direction backward pivot operation part 312 that pivots the sixth arm 17 toward the negative side in the U direction, that is, backwardly pivots the arm. For example, when the U direction forward pivot operation part 311 is press-operated, the sixth arm 17 may be pivoted toward the positive side in the U direction by an amount of multiplication of the number of press operations by a value displayed in the second display part 292. This applies to the U direction backward pivot operation part 312.

The second operation part 32 is an operation part for operation of pivoting the sixth arm 17 about the distal end second axis β parallel to the X-axis, i.e., the W directions and about the distal end third axis γ parallel to the Y-axis, i.e., the V directions at teaching. The second operation part 32 has a W direction forward pivot operation part 321 that pivots the sixth arm 17 toward the positive side in the W direction, that is, forwardly pivots the arm, a W direction backward pivot operation part 322 that pivots the sixth arm 17 toward the negative side in the W direction, that is, backwardly pivots the arm, a V direction forward pivot operation part 323 that pivots the sixth arm 17 toward the positive side in the V direction, that is, forwardly pivots the arm, and a V direction backward pivot operation part 324 that pivots the sixth arm 17 toward the negative side in the V direction, that is, backwardly pivots the arm. For example, when the W direction forward pivot operation part 321 is press-operated, the sixth arm 17 may be pivoted toward the positive side in the W direction by an amount of multiplication of the number of press operations by the value displayed in the second display part 292. This applies to the W direction backward pivot operation part 322, the V direction forward pivot operation part 323, and the V direction backward pivot operation part 324.

The third operation part 33 is an operation part for operation of switching between a first mode shown in FIG. 5 and a second mode shown in FIG. 6. A first control mode is a mode of enabling the operation by the first operation part 31 and the operation by the second operation part 32. A second control mode is a mode of enabling the operation by the first operation part 31 and disabling the operation by the second operation part 32. The functions and effects of the respective modes will be described later.

The fourth operation part 34 is an operation part for operation of the sixth arm 17 into the ready-to-start work state at teaching. It is preferable that the third operation part 33 is operated after the operation of the fourth operation part 34.

For example, a coordinate system of the working surface 400 is stored in advance (an X-axis and a Y-axis of the coordinate system are parallel to the working surface 400 and a Z-axis is orthogonal to the working surface 400). The fourth operation part 34 is operated and the Z-axis of the coordinate system of the working surface 400 stored in advance and the pivot axis (distal end first axis α) of the sixth arm 17 are parallelized. Thereby, the sixth arm 17 is set in the ready-to-start work state.

The fifth operation part 35 is an operation part for operation of moving the sixth arm 17 in the distal end second axis β direction parallel to the X-axis and in the distal end third axis γ direction parallel to the Y-axis at teaching. The fifth operation part 35 has an X-axis direction forward movement operation part 351 that moves the sixth arm 17 toward the positive side in the X-axis direction, that is, forwardly moves the arm, an X-axis direction backward movement operation part 352 that moves the sixth arm 17 toward the negative side in the X-axis direction, that is, backwardly moves the arm, a Y-axis direction forward movement operation part 353 that moves the sixth arm 17 toward the positive side in the Y-axis direction, that is, forwardly moves the arm, and a Y-axis direction backward movement operation part 354 that moves the sixth arm 17 toward the negative side in the Y-axis direction, that is, backwardly moves the arm. For example, when the X-axis direction forward movement operation part 351 is press-operated, the sixth arm 17 may be moved toward the positive side in the X-axis direction by an amount of multiplication of the number of press operations by a value displayed in the first display part 291. This applies to the X-axis direction backward movement operation part 352, the Y-axis direction forward movement operation part 353, and the Y-axis direction backward movement operation part 354.

The sixth operation part 36 is an operation part for operation of moving the sixth arm 17 in the distal end first axis α direction parallel to the Z-axis at teaching. The sixth operation part 36 has a Z-axis direction forward movement operation part 361 that moves the sixth arm 17 toward the positive side in the Z-axis direction, that is, forwardly moves the arm, and a Z-axis direction backward movement operation part 362 that moves the sixth arm 17 toward the negative side in the Z-axis direction, that is, backwardly moves the arm. For example, when the Z-axis direction forward movement operation part 361 is press-operated, the sixth arm 17 may be moved toward the positive side in the Z-axis direction by an amount of multiplication of the number of press operations by the value displayed in the first display part 291. This applies to the Z-axis direction backward movement operation part 362.

In the robot system 100, not only by the operation of the fourth operation part 34, but also by appropriate operation of the first operation part 31, the second operation part 32, the fifth operation part 35, and the sixth operation part 36, the robot 1 may be set in the ready-to-start work state.

As described above, the operation window (window) 2 contains the fourth operation part 34 for moving (operating) the sixth arm 17 as the above described robot distal end portion into the posture with the distal end first axis α perpendicular to the working surface 400, i.e., into the ready-to-start work state using the robot control unit 202. Thereby, compared to the case where the first operation part 31, the second operation part 32, the fifth operation part 35, and the sixth operation part 36 are appropriately combined and operated, the sixth arm 17 may be easily operated into the ready-to-start work state.

Alternatively, for example, in the case where the fourth operation part 34 is omitted, a function of moving (operating) the sixth arm 17 as the above described robot distal end portion into the posture with the distal end first axis α perpendicular to the working surface 400 using the robot control unit 202 when the third operation part 33 is operated may be provided. Thereby, a mode switching operation and the operation of setting the ready-to-start work state may be performed together and the operation efficiency is improved.

When the second operation part 32 is erroneously operated after the ready-to-start work state is set, as described above, the sixth arm 17 may pivot in the direction of the arrow M2 about the distal end second axis β.

As described above, in the operation window 2, the third operation part 33 is operated, and thereby, the first control mode shown in FIG. 5 and the second control mode shown in FIG. 6 can be switched.

In the robot system 100, for teaching of the control of the robot 1, first, the mode is set to the first control mode. In the first control mode, the operation by the first operation part 31 and the operation by the second operation part 32 may be enabled. Thereby, in the robot 1, the sixth arm 17 may be controlled into the posture with the distal end first axis α perpendicular to the working surface 400, i.e., into the ready-to-start work state.

Then, the third operation part 33 is operated, and thereby, the mode is switched to the second control mode. In the second control mode, the operation by the first operation part 31 may be enabled and the operation by the second operation part 32 may be disabled. Thereby, the erroneous operation of the second operation part 32 may be prevented after the ready-to-start work state is set. Therefore, the robot 1 may smoothly perform work while keeping the posture with the distal end first axis α perpendicular to the working surface 400.

Note that, in the second control mode, the display form of the second operation part 32 is made different from the display form of the second operation part 32 in the first control mode, and thereby, the operation by the second operation part 32 is disabled. The method of making the display form different is not particularly limited to, but includes e.g. a method by graying out including changing a color or the like, a method of reducing a size, a method of changing a shape, and a method of adding another mark. As shown in FIG. 6, the method by graying out is preferable. The method by graying out is used, and thereby, an operator may visually recognize that the second operation part 32 is excluded from objects to operate, and thus, the erroneous operation of the second operation part 32 may be prevented more reliably.

Further, the operation window (window) 2 contains the third operation part 33 for switching between the first mode and the second mode. Thereby, the operator who operates the robot system 100 may switch between the first mode and the second mode at arbitrary times.

Note that the operation window 2 has the configuration containing the third operation part 33 in the embodiment, however, may have a configuration in which the third operation part 33 is omitted. In the case where the third operation part 33 is omitted, for example, when a certain time elapses after the operation in the first mode ends, the mode may be automatically switched to the second mode.

As described above, the control apparatus 200 has the robot control unit 202 that controls the robot 1 having the sixth arm 17 as the robot distal end portion pivoting about the distal end first axis α and pivoting about the distal end second axis β crossing the distal end first axis α, and the display control unit 201 that displays the operation window (window) 2 containing the first operation part 31 for pivoting the sixth arm 17 about the distal end first axis α using the robot control unit 202 and the second operation part 32 for pivoting the sixth arm 17 about the distal end second axis β using the robot control unit 202 on the display unit 301.

In the operation window 2, the first control mode of enabling the operation by the first operation part 31 and the operation by the second operation part 32 and the second control mode of enabling the operation by the first operation part 31 and disabling the operation by the second operation part 32 can be switched. Further, for teaching of the control of the robot 1, the sixth arm 17 is controlled into the posture with the distal end first axis α perpendicular to the working surface 400 on which the robot 1 performs work in the first control mode, and then, the mode can be switched to the second control mode.

According to the present disclosure, as described above, the operation of the second operation part 32 may be prevented after the operations of the first operation part 31 and the second operation part 32. Thereby, after the ready-to-start work state is set, the robot 1 may prevent the sixth arm 17 from pivoting about the distal end second axis β in the direction of the arrow M2 and the distal end first axis α from inclining relative to the working surface 400, and thus, may smoothly perform work while keeping the posture with the distal end first axis α perpendicular to the working surface 400.

Further, the robot system 100 includes the control apparatus 200 and the robot 1. Thereby, the robot system 100 having the advantages of the above described control apparatus 200 may be obtained.

Second Embodiment

As below, the second embodiment of the control apparatus and the robot system according to the present disclosure will be explained with reference to FIG. 7, and the explanation will be made with a focus on the differences from the above described embodiment and the explanation of the same items will be omitted.

The embodiment is the same as the above described first embodiment except that the configuration of the second control mode is different.

Figure 7:
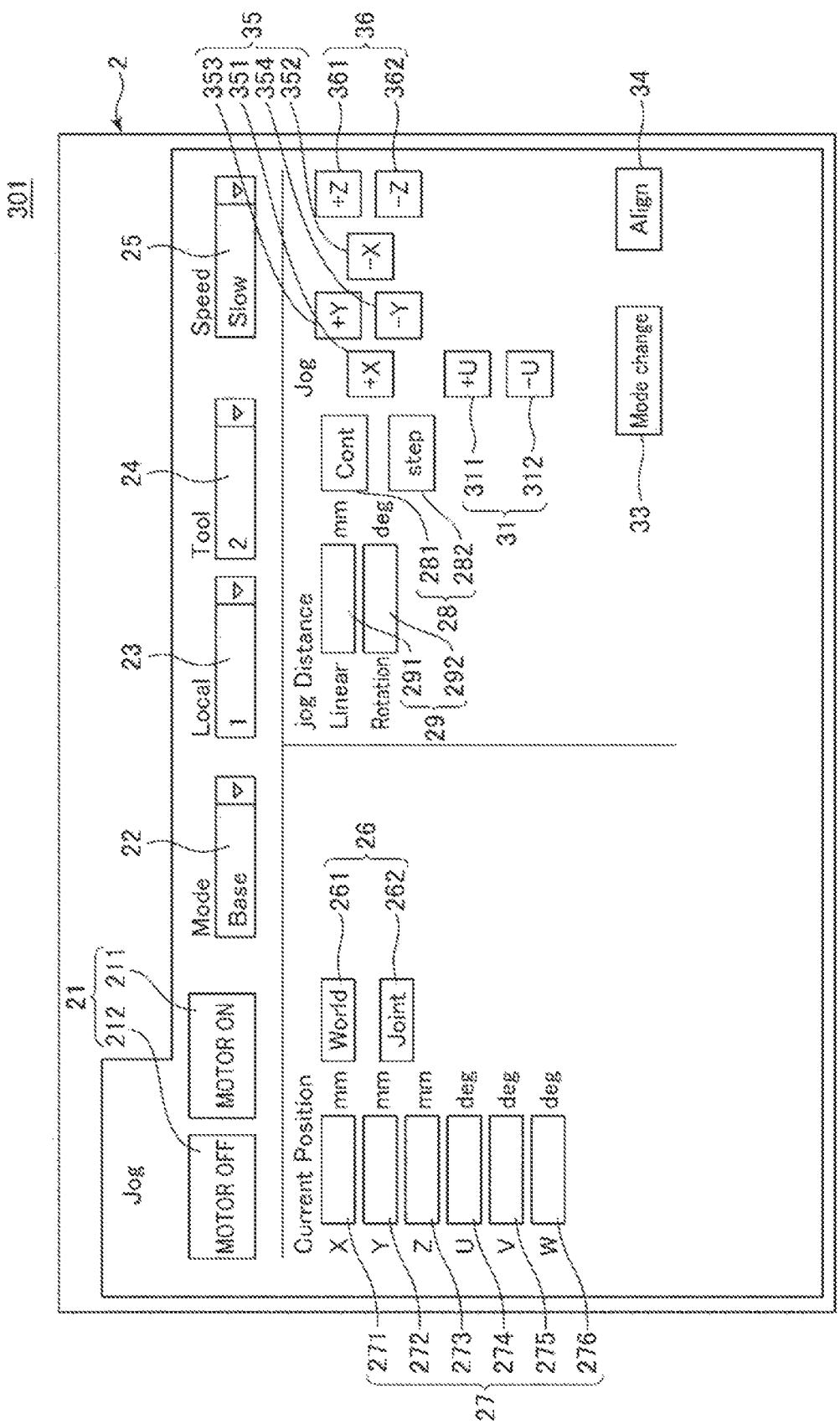
FIG. 7 shows a second control mode of a window displayed on a monitor of a robot system of a second embodiment.

As shown in FIG. 7, in the embodiment, it is known that the second operation part 32 is hidden in the second control mode compared to the second control mode shown in FIG. 6. As described above, in the second control mode, the second operation part 32 is hidden, and thereby, press operation of the second operation part 32 is impossible. As a result, the operation by the second operation part 32 is disabled. Thereby, the operator may prevent erroneous operation of the second operation part 32 more reliably.

Third Embodiment

As below, the third embodiment of the control apparatus and the robot system according to the present disclosure will be explained with reference to FIG. 8, and the explanation will be made with a focus on the differences from the above described embodiments and the explanation of the same items will be omitted.

The embodiment is the same as the above described first embodiment except that the configuration of the second control mode is different.

Figure 8:
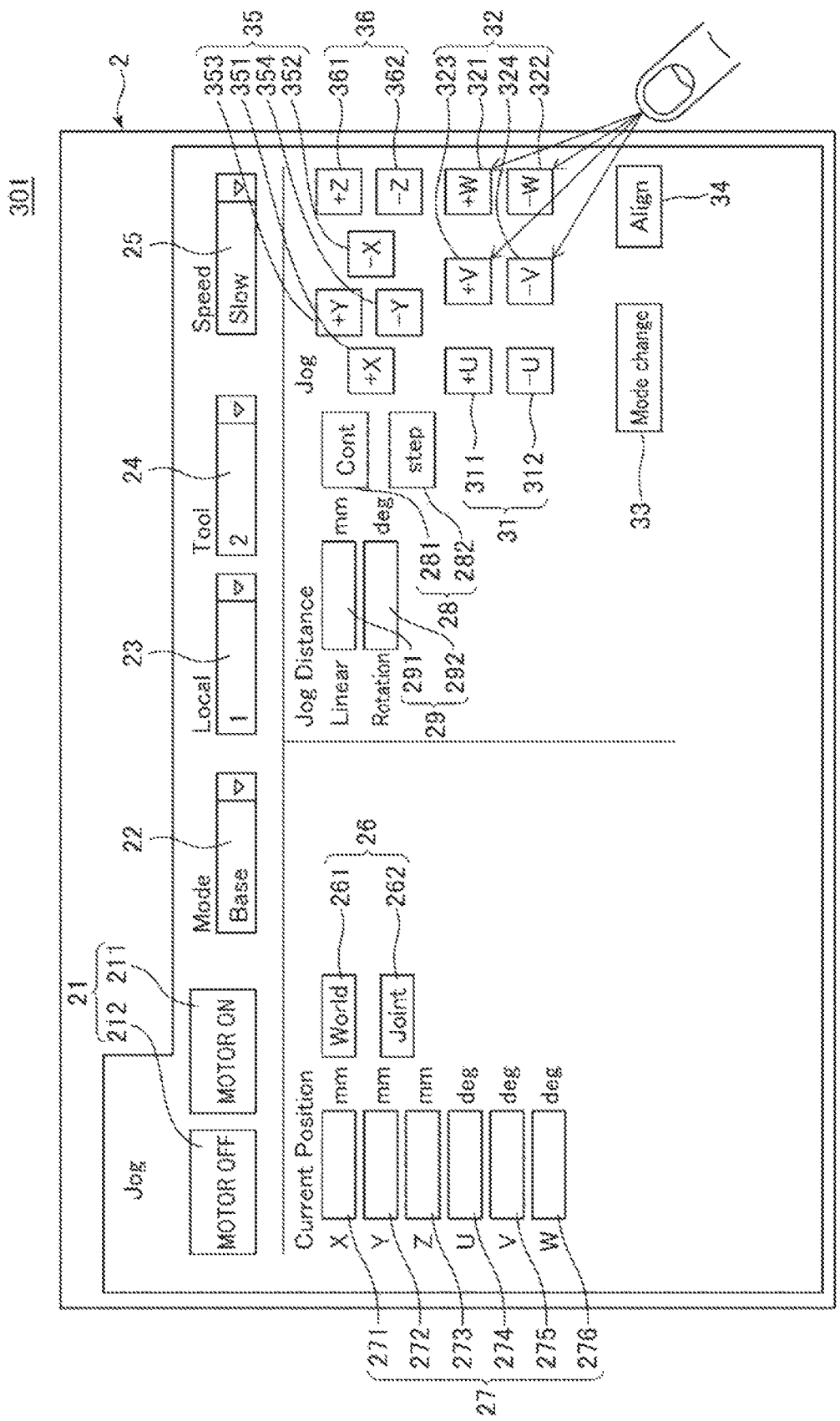
FIG. 8 shows a second control mode of a window displayed on a monitor of a robot system of a third embodiment.

As shown in FIG. 8, in the embodiment, the second control mode is configured so that, though the second operation part 32 is apparently left as it is, if the operator press-operates the second operation part 32, the signal generated at the press is not transmitted to the robot 1. Thereby, the operator may prevent erroneous operation of the second operation part 32 more reliably.

Figure 9:
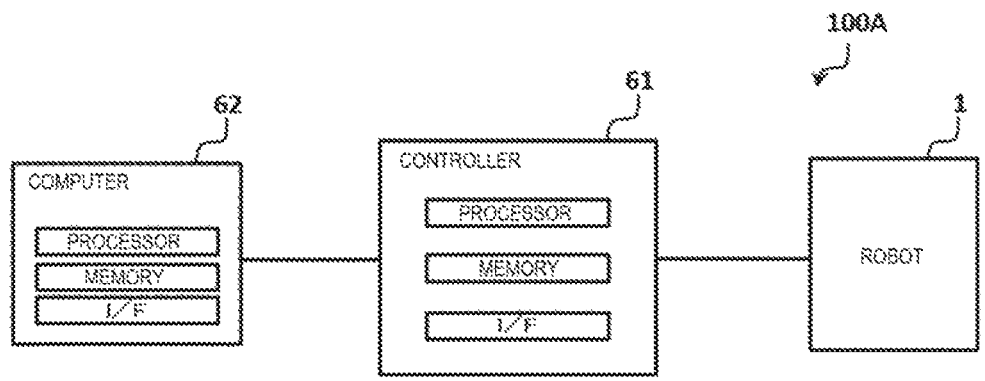
FIG. 9 is a block diagram for explanation of the robot systems of the first embodiment to the third embodiment with a focus on hardware.

FIG. 9 is the block diagram for explanation of the robot systems of the first embodiment to the third embodiment with the focus on hardware.

FIG. 9 shows an overall configuration of a robot system 100A in which the robot 1, a controller 61, and a computer 62 are coupled. The control of the robot 1 may be executed by reading commands in a memory using a processor in the controller 61 or executed via the controller 61 by reading commands in a memory using a processor in the computer 62.

Therefore, one or both of the controller 61 and the computer 62 may be regarded as "control apparatus 200".

Modified Example 1

Figure 10:
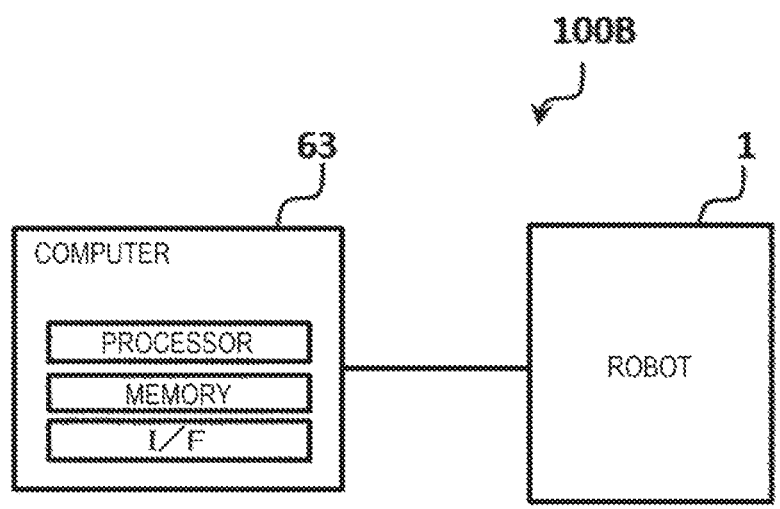
FIG. 10 is a block diagram showing modified example 1 with a focus on hardware of the robot system.

FIG. 10 is the block diagram showing modified example 1 with the focus on hardware of the robot system.

FIG. 10 shows an overall configuration of a robot system 100B in which a computer 63 is directly coupled to the robot 1. The control of the robot 1 is directly executed by reading commands in a memory using a processor in the computer 63.

Therefore, the computer 63 may be regarded as "control apparatus 200".

Modified Example 2

Figure 11:
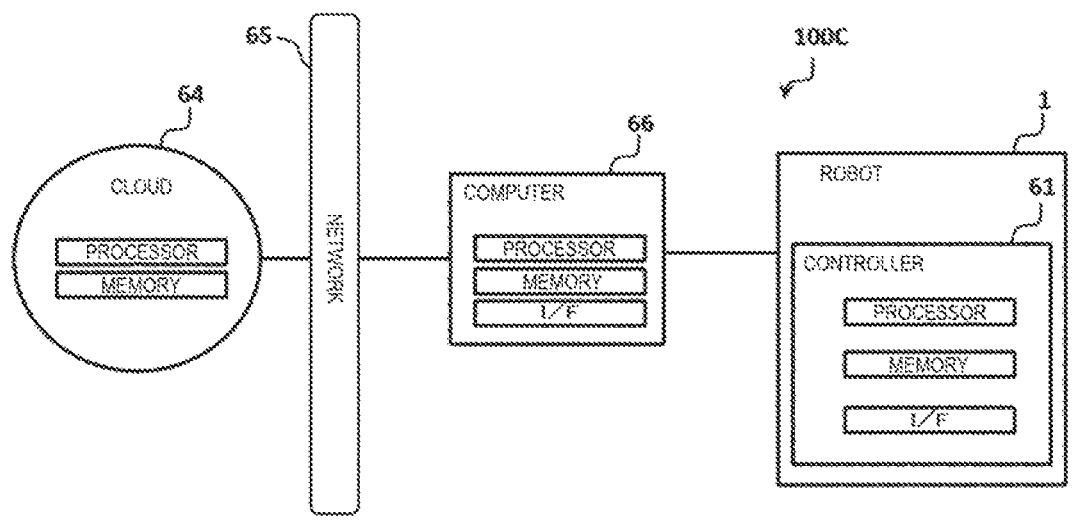
FIG. 11 is a block diagram showing modified example 2 with a focus on hardware of the robot system.

FIG. 11 is the block diagram showing modified example 2 with the focus on hardware of the robot system.

FIG. 11 shows an overall configuration of a robot system 100C in which the robot 1 containing the controller and a computer 66 are coupled and the computer 66 is coupled to a cloud 64 via a network 65 such as a LAN. The control of the robot 1 may be executed by reading commands in a memory using a processor in the computer 66 or executed via the computer 66 by reading commands in a memory using a processor on the cloud 64.

Therefore, one, two, or three of the controller 61, the computer 66, and the cloud 64 may be regarded as "control apparatus 200".

As above, the control apparatus and the robot system according to the present disclosure are explained with respect to the illustrated embodiments, but, the present disclosure is not limited to those. The respective parts forming the robot and the robot system may be replaced by those having arbitrary configurations that may fulfill the same functions. Further, an arbitrary configuration may be added thereto.

Alternatively, the control apparatus and the robot system according to the present disclosure may be formed by combinations of arbitrary two or more configurations and features of the above-described respective embodiments.

Further, the number of arms of the robot is one, but, not limited to that. Two or more arms may be provided.

Furthermore, the display unit is not limited to one built in a notebook or tablet PC, and, may be e.g. one built in a desktop PC or the like.

What is claimed is:
1. A control apparatus comprising:
  a memory configured to store a program; and
  a processor configured to execute the program so as to:
    control a distal end portion of a vertical articulated robot to rotate around a first distal end axis and a second distal end axis of the distal end portion, the second distal end axis perpendicular to the first distal end axis;
    perform a first control mode in which the distal end portion rotates around the first distal end axis and the second distal end axis when conducting a teaching operation of the vertical articulated robot;
    perform a second control mode in which the distal end portion rotates around the first distal end axis and does not rotate around the second distal end axis when conducting the teaching operation of the vertical articulated robot;

move the distal end portion toward a working surface and set the first distal end axis to be perpendicular to the working surface while performing the first control mode;

automatically switch the first control mode to the second control mode without an input by an operator when a certain period of time elapses after the first distal end axis is set to be perpendicular to the working surface and the second distal end axis is set to be parallel to the working surface;

control the distal end portion to work while performing the second control mode and maintaining a state in which the first distal end axis is set to be perpendicular to the working surface after the first control mode is automatically switched to the second control mode; and manually switch the second control mode to the first control mode with the input by the operator.

2. The control apparatus according to claim 1, wherein the first control mode is controlled via a first control screen of a display and the second control mode is controlled via a second control screen of the display, and a first display form of the second control screen in the second control mode is different from a second display form of the second control screen in the first control mode.

3. The control apparatus according to claim 2, wherein the second display form corresponds to a state in which the second control screen is not displayed on the display.

4. The control apparatus according to claim 2, wherein the display contains a third control screen for switching between the first control mode and the second control mode.

5. The control apparatus according to claim 4, wherein when the third control screen has been executed, the distal end portion is moved to the working surface and the first distal end axis is set to be perpendicular to the working surface.

6. The control apparatus according to claim 4, wherein the display contains a fourth control screen for moving the distal end portion toward the working surface and setting the first distal end axis to be perpendicular to the working surface.

7. A robot system comprising:

a vertical articulated robot having a distal end portion, the distal end portion rotating around a first distal end axis and a second distal end axis of the distal end portion, the second distal end axis perpendicular to the first distal end axis;

a memory configured to store a program; and a processor configured to execute the program so as to:
control the distal end portion of the vertical articulated robot to rotate around the first distal end axis and the second distal end axis;

perform a first control mode in which the distal end portion rotates around the first distal end axis and the second distal end axis when conducting a teaching operation of the vertical articulated robot;

perform a second control mode in which the distal end portion rotates around the first distal end axis and does not rotate around the second distal end axis when conducting the teaching operation of the vertical articulated robot;

move the distal end portion toward a working surface and set the first distal end axis to be perpendicular to the working surface while performing the first control mode;

automatically switch the first control mode to the second control mode without an input by an operator when a certain period of time elapses after the first distal end axis is set to be perpendicular to the working surface and the second distal end axis is set to be parallel to the working surface;

control the distal end portion to work while performing the second control mode and maintaining a state in which the first distal end axis is set to be perpendicular to the working surface after the first control mode is automatically switched to the second control mode; and manually switch the second control mode to the first control mode with the input by the operator.

8. A control method for controlling a vertical articulated robot having a distal end portion that pivots about a first distal end axis of the distal end portion and pivots about a second distal end axis of the distal end portion, the second distal end axis perpendicular to the first distal end axis, by causing a processor to execute a program stored in a memory, the method comprising executing on the processor the steps of:

controlling the distal end portion of the vertical articulated robot to rotate around the first distal end axis and the second distal end axis;

performing a first control mode in which the distal end portion rotates around the first distal end axis and the second distal end axis when conducting a teaching operation of the vertical articulated robot;

performing a second control mode in which the distal end portion rotates around the first distal end axis and does not rotate around the second distal end axis when conducting the teaching operation of the vertical articulated robot;

moving the distal end portion toward a working surface and set the first distal end axis to be perpendicular to the working surface while performing the first control mode;

automatically switching the first control mode to the second control mode without an input by an operator when a certain period of time elapses after the first distal end axis is set to be perpendicular to the working surface and the second distal end axis is set to be parallel to the working surface;

controlling the distal end portion to work while performing the second control mode and maintaining a state in which the first distal end axis is set to be perpendicular to the working surface after the first control mode is automatically switched to the second control mode; and manually switch the second control mode to the first control mode with the input by the operator.

* * * * *